United States Patent
Liu et al.

(10) Patent No.: US 12,534,742 B2
(45) Date of Patent: Jan. 27, 2026

(54) COMPOUND FOR REGULATING GENE EDITING EFFICIENCY AND APPLICATION THEREOF

(71) Applicants: Shanghai Institute of Organic Chemistry, Chinese Academy of Sciences, Shanghai (CN); SHANGHAITECH UNIVERSITY, Shanghai (CN)

(72) Inventors: Jia Liu, Shanghai (CN); Jiajia Dong, Shanghai (CN)

(73) Assignees: Shanghai Institute of Organic Chemistry, Chinese Academy of Sciences, Shanghai (CN); ShanghaiTech University, Shanghai (CN)

( * ) Notice: Subject to any disclaimer, the term of this patent is extended or adjusted under 35 U.S.C. 154(b) by 1223 days.

(21) Appl. No.: 17/121,449

(22) Filed: Dec. 14, 2020

(65) Prior Publication Data

US 2021/0207175 A1    Jul. 8, 2021

Related U.S. Application Data

(63) Continuation of application No. PCT/CN2019/091081, filed on Jun. 13, 2019.

(30) Foreign Application Priority Data

Jun. 13, 2018  (CN) .......................... 201810609677.3

(51) Int. Cl.
C12N 15/90    (2006.01)
C07D 403/12    (2006.01)
(Continued)

(52) U.S. Cl.
CPC .......... C12N 15/907 (2013.01); C07D 403/12 (2013.01); C12N 9/22 (2013.01);
(Continued)

(58) Field of Classification Search
None
See application file for complete search history.

(56) References Cited

U.S. PATENT DOCUMENTS

| | | | |
|---|---|---|---|
| 2014/0242702 A1 | 8/2014 | Chen et al. | |
| 2015/0018332 A1* | 1/2015 | Sandanayaka | C07D 403/06 435/375 |
| 2022/0249486 A1* | 8/2022 | Du | A61K 38/465 |

FOREIGN PATENT DOCUMENTS

| | | |
|---|---|---|
| CN | 105408497 A | 3/2016 |
| WO | WO 2018/013840 A1 | 1/2018 |

OTHER PUBLICATIONS

Chaudhuri et al., Nat Rev Mol Cell Biol 18, 610-621 (2017) (Year: 2017).*

(Continued)

*Primary Examiner* — Karl J Puttlitz
(74) *Attorney, Agent, or Firm* — Wolf, Greenfield & Sacks, P.C.

(57) ABSTRACT

A compound for improving the gene editing specificity and application thereof. Specifically disclosed is a compound represented by formula I or a use of a pharmaceutically acceptable salt thereof. The compound and the pharmaceutically acceptable salt thereof are used for preparing an inhibitor, a composition, or a formulation for inhibiting gene editing and/or improving the gene editing specificity. The structure of the formula I is as stated in the description. The compound can significantly improve the accuracy of CRISPR gene editing, thereby providing a simple and high-efficient policy for accurate gene editing.

16 Claims, 4 Drawing Sheets

(51) Int. Cl.
  *C12N 9/22* (2006.01)
  *C12N 15/11* (2006.01)
(52) U.S. Cl.
  CPC .......... *C12N 15/11* (2013.01); *C12N 2310/20* (2017.05); *C12N 2800/80* (2013.01)

(56) References Cited

OTHER PUBLICATIONS

Stoddard; Quarterly Reviews of Biophysics. 2005;38(1):49-95 (Abstract), downloaded Jun. 26, 2024 from: https://www.cambridge.org/core/journals/quarterly-reviews-of-biophysics/article/abs/homing-endonuclease-structure-and-function/CDACC8E437866D03359353E8E9BA (Year: 2005).*
Neggers et al., Chemistry & Biology, vol. 22, Issue 1, 2015, pp. 107-116 (Year: 2015).*
Graphical Abstract, downloaded Nov. 20, 2024 from https://www.sciencedirect.com/science/article/pii/S1074552114004256#:~:text=Exportin%2D1%20(XPO1/CRM1,in%20the%20higher%20eukaryotic%20cell (Year: 2015).*
Database Registry Chemical Abstracts Service, Columbus, Ohio, US; Registry No. 1393477-72-9, 2-Propenoic acid, 3-[3-[3,5-bis(trifluoromethyl)phenyl]-1H-1,2,4-triazol-1-yl]-, 2-(2-pyrazinyl) hydrazide, entered 2012 (Year: 2012).*
PCT/CN2019/091081, Sep. 11, 2019, International Search Report and Written Opinion and English translations thereof.
PCT/CN2019/091081, Dec. 24, 2020, International Preliminary Report on Patentability and English translation thereof.
International Search Report and Written Opinion for Application No. PCT/CN2019/091081, mailed Sep. 11, 2019.
International Preliminary Report on Patentability for Application No. PCT/CN2019/091081, mailed Dec. 24, 2020.
Neggers et al., Identifying drug-target selectivity of small-molecule CRM1/XPO1 inhibitors by CRISPR/Cas9 genome editing. Chem Biol. Jan. 22, 2015;22(1):107-16. doi: 10.1016/j.chembiol.2014.11.015. Epub Jan. 8, 2015.
Pelascini et al., Histone deacetylase inhibition rescues gene knockout levels achieved with integrase-defective lentiviral vectors encoding zinc-finger nucleases. Hum Gene Ther Methods. Dec. 2013;24(6):399-411. doi: 10.1089/hgtb.2013.107. Epub Oct. 29, 2013.
Robert et al., Pharmacological inhibition of DNA-PK stimulates Cas9-mediated genome editing. Genome Med. Aug. 27, 2015;7(1):93. doi: 10.1186/s13073-015-0215-6.
Takayama et al., Highly efficient biallelic genome editing of human ES/iPS cells using a CRISPR/Cas9 or TALEN system. Nucleic Acids Res. May 19, 2017;45(9):5198-5207. doi: 10.1093/nar/gkx130.
Office Action for Japanese Application No. 2021-518841, mailed Mar. 1, 2022.
Office Action for Japanese Application No. 2021-518841, mailed May 8, 2023.
Extended European Search Report for Application No. 19819202.3, mailed May 25, 2022.
Das et al., Clinical and radiological profile of posterior cortical atrophy and comparison with a group of typical Alzheimer disease and amnestic mild cognitive impairment. Acta Neurol Belg. Aug. 2021;121(4):1009-1018. doi: 10.1007/s13760-020-01547-4. Epub Nov. 23, 2020.
Nishimasu et al., Crystal structure of Cas9 in complex with guide RNA and target DNA. Cell. Feb. 27, 2014;156(5):935-49. doi: 10.1016/j.cell.2014.02.001. Epub Feb. 13, 2014.
Vercruysse et al., The Second-Generation Exportin-1 Inhibitor KPT-8602 Demonstrates Potent Activity against Acute Lymphoblastic Leukemia. Clin Cancer Res. May 15, 2017;23(10):2528-2541. doi: 10.1158/1078-0432.CCR-16-1580. Epub Oct. 25, 2016.
Yamano et al., Crystal structure of Cpf1 in complex with guide RNA and target DNA. Cell. Author manuscript; available in PMC Jun. 9, 2016. Published in final edited form as: Cell. May 5, 2016; 165(4): 949-962. Published online Apr. 21, 2016. doi: 10.1016/j.cell.2016.04.003.

\* cited by examiner

COMPOUND FOR REGULATING GENE EDITING EFFICIENCY AND APPLICATION THEREOF

RELATED APPLICATIONS

This Application is a continuation of International Application No. PCT/CN2019/091081, filed Jun. 13, 2019, which claims the benefit under 35 U.S.C. § 119(a)-(d) or 35 U.S.C. § 365(b) of Chinese application number 201810609677.3, filed Jun. 13, 2018, the contents of each of which are incorporated herein by reference in their entireties.

TECHNICAL FIELD

The present invention relates to the field of biology, and more specifically, relates to compound for regulating gene editing efficiency and applications thereof.

BACKGROUND

With the advent of gene editing technology, effective gene editing and transformation of different cells have been enabled. Site-specific recognition of nucleases can lead to DNA double-strand breaks at specific locations in the genome and trigger endogenous DNA repair mechanisms. Using the method of non-homologous end joining (NHEJ) to repair DNA double-strand breaks would lead to the insertion or deletion of small fragments, which can be used to generate knockout mutants. Homologous directed repair (HDR) can be used to construct knock-in mutants or reporter cell lines. However, even with the assistance of these site-specific nucleases, precise genome editing through homology-directed repair is still very challenging.

With the discovery of nucleases such as Cas9, some gene editing technologies based on CRISPR technology have been developed, such as CRISPR-Cas9-mediated gene editing. CRISPR/Cas9 is an adaptive immune defense formed during the long-term evolution of bacteria and archaea, which can be used to combat invading viruses and foreign DNA. The CRISPR/Cas9 system integrates fragments of invading phage and plasmid DNA into CRISPR, and uses corresponding CRISPR RNAs (crRNAs) to guide the degradation of homologous sequences, thereby providing immunity.

CRISPR-Cas9 technology is the fourth method that can be used for site-specific construction of gene knockout cells and animals following zinc finger Nuclease (ZFN), homing endonuclease and TALEN technologies, which is of high efficiency and knockout speed as well as strong germline transfer ability and convenience. CRISPR would have a very broad application prospect in fields such as cell model construction, animal model construction, drug target identification, disease treatment, etc. Compared with ZFN/TALEN, CRISPR/Cas is easier to operate, more efficient, and easier to obtain homozygous mutants, and being able to introduce multiple mutations at different sites at the same time.

However, the accuracy of CRISPR-Cas9 gene editing is still not satisfying.

Therefore, there is an urgent need in this field to develop new compound that can regulate the efficiency of the CRISPR/Cas9 gene editing system, especially to improve its specificity.

SUMMARY OF THE INVENTION

The purpose of the present invention is to provide a compound for improving the gene editing specificity and application thereof.

In the first aspect of the present invention, a use of the compound represented by Formula I, or pharmaceutically acceptable salt thereof, or optical isomer or racemate, or solvate thereof, for the preparation of inhibitor, composition or formulation that inhibit gene editing and/or improve gene editing specificity is provided;

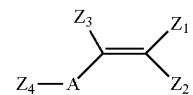

wherein, $Z_1$ is H or -L1-W, wherein L1 is absent, or divalent linking group, and the divalent linking group has one or more linking units selected from the group consisting of substituted or unsubstituted —C1-C3 alkylene, substituted or unsubstituted —NH—, substituted or unsubstituted —NH—NH—, —O—, —S—, substituted or unsubstituted—C3-C6 cycloalkylene, substituted or unsubstituted 3-6 membered heterocyclylene, substituted or unsubstituted C6-C10 arylene, substituted or unsubstituted C3-C10 heteroarylene, or a combination thereof; wherein, the heteroarylene or the heterocyclylene contains 1-3 heteroatoms selected from N, O, S;

W is halogen, substituted or unsubstituted C1-C10 alkyl, substituted or unsubstituted C2-C10 alkenyl, substituted or unsubstituted C2-C10 alkenyloxy, substituted or unsubstituted C2-C10 alkynyl, substituted or unsubstituted C2-C10 alkynyloxy, substituted or unsubstituted C3-C10 cycloalkyl, substituted or unsubstituted C1-C10 alkoxy, substituted or unsubstituted C6-C10 aryl, substituted or unsubstituted C3-C10 heteroaryl, substituted or unsubstituted 5-10 membered heterocyclic ring, substituted or unsubstituted 3-10 membered carbocyclic ring (containing 1 to 3 unsaturated bonds); wherein, the heteroaryl or heterocyclic ring contains 1-3 heteroatoms selected from N, O, S;

wherein, the "substituted" means that the H in the group is replaced by one or more substituents selected from the group consisting of halogen, oxo (═O), C1-C4 alkyl, C1-C4 haloalkyl, —ORa, —NRaRb, phenyl, benzyl, C1-C4 alkoxy; wherein the phenyl and benzyl are unsubstituted or have 1-4 substituents selected from the group consisting of halogen, C1-C4 alkyl, C1-C4 haloalkyl, —OH, —NH$_2$;

wherein, Ra and Rb are each independently H, C1-C4 alkyl, or C1-C4 haloalkyl;

$Z_2$ is H, or -L1-W, wherein L1 and W are as defined above;

$Z_3$ is H, or -L1-W, wherein L1 and W are as defined above;

$Z_4$ is H, or -L1-W, wherein L1 and W are as defined above;

A is —(C═O)— or —SO$_2$—;

alternatively, $Z_4$, A and $Z_2$ together with the connected carbon atom form a substituted or unsubstituted 5-8 membered ring, and the "substituted" is as described above;

and/or, $Z_3$ and $Z_1$ together with the connected carbon atom form a substituted or unsubstituted 5-8 membered ring; and the definition of the substitution is as described above.

In another preferred embodiment, the substituted or unsubstituted 5-8 membered ring is a 6-membered or 7-membered carbocyclic ring.

In another preferred embodiment, the substituted or unsubstituted 5-8 membered ring contains 0, 1, or 2 heteroatoms, and the heteroatom is selected from the group consisting of N, O and S.

In another preferred embodiment, the substituted or unsubstituted 5-8 membered ring comprises the structure unit "—CO—CRc=CRc-CO—", wherein Rc is H, C1-C10 alkyl, C1-C10 haloalkyl-OH, halogen, C3-C8 cycloalkyl, or benzyl.

In another preferred embodiment, the A, $Z_1$, $Z_2$, $Z_3$ and $Z_4$ in Formula I are the corresponding groups of each specific compound in Table 1.

In another preferred embodiment, the compound of Formula I is a compound represented by Formula A:

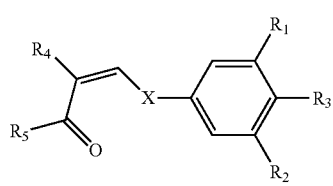

(A)

wherein,

X is

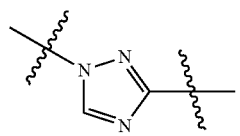 [SMILES: *c1ncn(*)n1]

or none;

$R_1$, $R_2$ and $R_3$ are each independently selected from the group consisting of H, halogen, C1-C6 alkyl, halogenated C1-C6 alkyl, C1-C6 alkoxy, halogenated C1-C6 alkoxy;

$R_4$ is selected from the group consisting of H, 6-membered aromatic heterocyclic ring containing 1-2 nitrogen atoms;

$R_5$ is selected from the group consisting of amino, substituted or unsubstituted C1-C6 alkoxy, substituted or unsubstituted 6-membered aromatic heterocyclic ring —NH—NH— containing 1-2 nitrogen atoms, substituted or unsubstituted 4-6-membered unsaturated heterocyclic ring containing 1-2 nitrogen atoms; the substituted means substituted by group selected from the group consisting of halogen and oxo.

In another preferred embodiment, the "improving gene editing specificity" comprises reducing the off-target ratio of gene editing, increasing the of targeted/off-target ratio in gene editing.

In another preferred embodiment, the "inhibition of gene editing" comprises inhibiting of DNA repair based on non-homologous end joining (NHEJ).

In another preferred embodiment, the "inhibition of gene editing" comprises inhibiting of DNA repair based on homologous end joining (HDR).

In another preferred embodiment, the "improving gene editing specificity" refers to A1/A2≥1.5, preferably, A1/A2≥2, more preferably, A1/A2≥3, wherein A1 represents the ratio between the number of scheduled gene editing at specific sites to the number of scheduled gene editing at non-specific sites (ie, the number of off-targets) when no compound is added during compounding, A2 represents the ratio between the number of scheduled gene editing at specific sites and the number of scheduled gene editing at non-specific sites when the compound is added.

In another preferred embodiment, the composition comprises pharmaceutical composition.

In another preferred embodiment, the 6-membered aromatic heterocyclic ring comprising 1-2 nitrogen atoms is

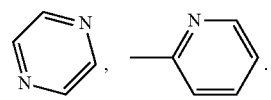

In another preferred embodiment, the 4-6 membered unsaturated heterocyclic ring comprising 1-2 nitrogen atoms is

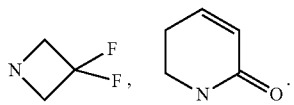

In another preferred embodiment, the X, $R_1$, $R_2$, $R_3$, $R_4$ and $R_5$ in Formula A are the corresponding groups of each specific compound in Table 1.

In another preferred embodiment, the compound is

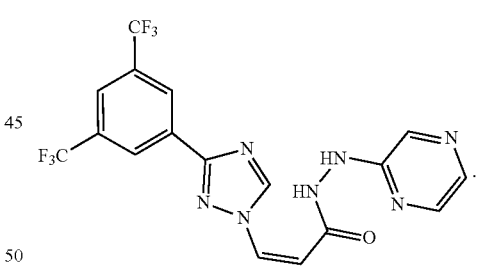

In another preferred embodiment, the compound is

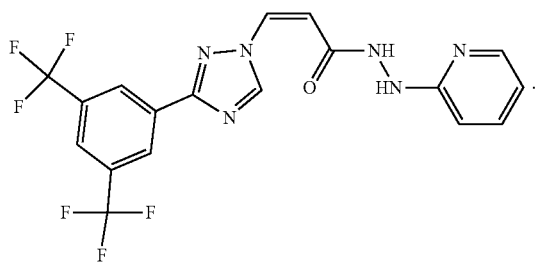 [SMILES: O=C(/C=C\n1cnc(-c2cc(C(F)(F)F)cc(C(F)(F)F)c2)n1)NNc1ccccn1]

In another preferred embodiment, the compound is

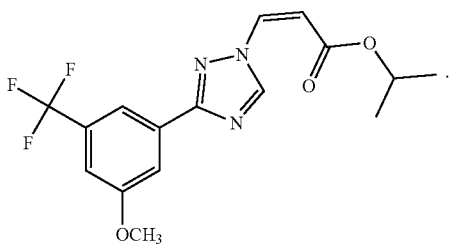 [SMILES: COc1cc(-c2ncn(/C=C\C(=O)OC(C)C)n2)cc(C(F)(F)F)c1]

In another preferred embodiment, the compound is

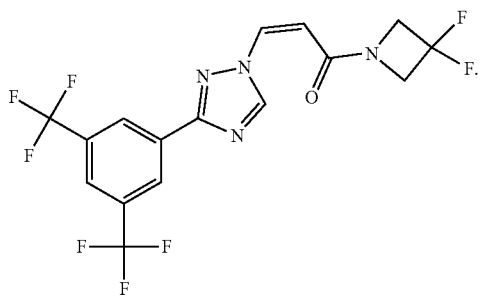 [SMILES: O=C(/C=C\n1cnc(-c2cc(C(F)(F)F)cc(C(F)(F)F)c2)n1)N1CC(F)(F)C1]

In another preferred embodiment, the compound is

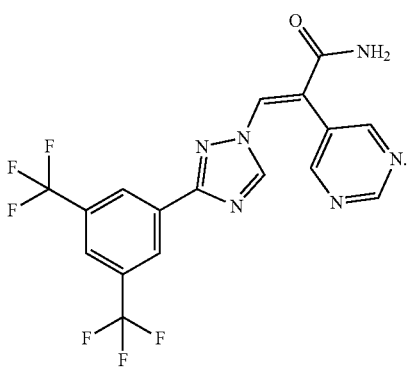 [SMILES: NC(=O)/C(=C/n1cnc(-c2cc(C(F)(F)F)cc(C(F)(F)F)c2)n1)c1cncnc1]

In another preferred embodiment, the compound is

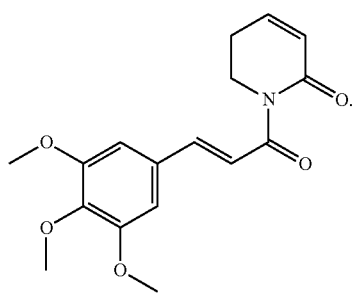 [SMILES: COc1cc(/C=C/C(=O)N2CCC=CC2=O)cc(OC)c1OC]

In another preferred embodiment, the gene editing comprises gene editing based on homing endonuclease, engineered zinc finger protein, TALE system, CRISPR system (Cas9, c2c2, or cpf1).

In another preferred embodiment, the gene editing comprises gene editing based on base editing.

In another preferred embodiment, the gene editing comprises nucleic acid cleavage, base substitution (or base editing), or combinations thereof.

In another preferred embodiment, the base substitution is a single base conversion without nucleic acid cleavage selected from the group consisting of C→T conversion, C→G conversion, A→G conversion, or combinations thereof.

In another preferred embodiment, the enzyme used for base editing comprises APOBEC1, APOBEC3A, hAPOBEC3A, or combinations thereof.

In another preferred embodiment, the gene editing comprises: mutation of genomic DNA, activation or inhibition of gene expression, RNA editing, and epigenetic editing of genomic DNA.

In another preferred embodiment, the gene editing comprises CRISPR-Cas9-based gene editing.

In another preferred embodiment, the Cas9 comprises wild-type and mutant-type Cas9 proteins.

In another preferred embodiment, the Cas9 is selected from the group consisting of *Streptococcus pyogenes* Cas9 (SpyCas9), *Staphylococcus aureus* Cas9 (SaCas9), and Cpf1 family.

In another preferred embodiment, the gene editing comprises in vivo gene editing, in vitro gene editing, or combinations thereof.

In another preferred embodiment, the sample targeted for gene editing is selected from the group consisting of cells, tissues, organs, or combinations thereof.

In another preferred embodiment, the sample is from animals, plants, microorganisms (including bacteria and viruses).

In another preferred embodiment, the sample is from human and non-human mammals.

In another preferred embodiment, the cells include primary cells and passaged cells.

In another preferred embodiment, the cells comprise somatic cells, germ cells, and stem cells.

In another preferred embodiment, the stem cells comprises totipotent stem cells, pluripotent stem cells, and multipotent stem cells.

In another preferred embodiment, the stem cells are human induced pluripotent stem cells (hiPSC).

In another preferred embodiment, the cells comprise embryonic stem cells, adipose stem cells, hematopoietic stem cells, immune cells (such as T cells, NK cells).

In another preferred embodiment, the formulation includes pharmaceutical composition.

In the second aspect of the present invention, a method for inhibiting gene editing in cells in vitro and/or improving the specificity of gene editing is provided, which comprises:

in the presence of a gene editing inhibitor, performing gene editing on cell so as to inhibit gene editing in the cell, wherein, the gene editing inhibitor is a compound represented by Formula A, or pharmaceutically acceptable salt, or optical isomer or racemate, or solvate thereof; (wherein the Formula A is defined as in claim 1).

In another preferred embodiment, during the step, contacting the gene editing inhibitor with the cell which is subjected to gene editing before, during, and/or after performing gene editing;

In another preferred embodiment, the in vitro gene editing is performed in an in vitro reaction system;

In another preferred embodiment, in the in vitro reaction system, the concentration of the gene editing inhibitor is 0.01-100 M;

In another preferred embodiment, the method is non-diagnostic and non-therapeutic.

In the third aspect of the present invention a reagent product (or reagent combination) is provided, comprising:
(i) a first agent, which is a gene editing inhibitor, while the inhibitor is a compound represented by Formula A, or pharmaceutically acceptable salt, optical isomer or racemate, or solvate thereof; (wherein the Formula A is defined as in claim 1); and
(ii) a second reagent, which is a reagent for CRISPR gene editing;

In another preferred embodiment, the second reagent comprises one or more reagents selected from the group consisting of
(c1) Cas9 nuclease, the coding sequence of Cas9 nuclease, or a vector expressing Cas9 nuclease, or combinations thereof;
(c2) gRNA, crRNA, or a vector for generating gRNA or crRNA;
(c3) template for homologous targeted repair: single-stranded nucleotide sequence or plasmid vector.

In another preferred embodiment, it is used to prepare a kit for inhibiting gene editing and/or improving gene editing specificity.

In another preferred embodiment, the kit further comprises specification.

In another preferred embodiment, the specification describes the method for inhibiting gene editing of the present invention.

In another preferred embodiment, the gene editing is for somatic cells and stem cells.

In another preferred embodiment, the gene editing is the gene editing based on CRISPR-Cas9.

In another preferred embodiment, the cells are selected from the group consisting of embryonic stem cells, pluripotent stem cells, and human embryonic kidney 293T cells.

In another preferred embodiment, the gene editing targets disease-causing genes, tumor-related genes (such as oncogenes), immune-related genes (such as genes related to autoimmunity), visual-related genes, auditory-related genes, metabolism-related genes, virus infection-related genes, and genetic disease-related genes.

In another preferred embodiment, the gene is selected from the group consisting of OCT4, ALBUMIN, ALKBH1, CCR5, CXCR4, PCSK9, Dystrophin, AAVS1, Tmc1 or the combinations thereof.

In the fourth aspect of the present invention, a kit is provided, which comprising (i) a first container, and a first agent located in the first container, the first agent is a gene editing inhibitor which is a compound represented by Formula I, or pharmaceutically acceptable salt, optical isomer or racemate, or solvate thereof;

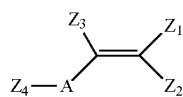

I wherein Formula I is as defined in claim 1; and
(ii) a second container, and a second reagent in the second container, and the second reagent is a reagent for CRISPR gene editing.

In another preferred embodiment, the compound of Formula I is a compound of Formula A.

In the fifth aspect of the present invention, a method for inhibiting gene editing and/or improving the specificity of gene editing is provided, which comprising the steps: administering a gene editing inhibitor and a gene editing reagent for gene editing to a subject in need, while the editing inhibitor is a compound represented by Formula I, or pharmaceutically acceptable salt, or optical isomer or racemate, or solvate thereof; wherein the Formula I is as defined in claim 1.

In another preferred embodiment, the subject comprises humans and non-human mammals.

In another preferred embodiment, the gene editing reagent comprises CRISPR-Cpf1-based gene editing reagent.

In another preferred embodiment, before, during, and/or after the administration of the gene editing inhibitor, the subject is administered a gene editing agent for gene editing.

It should be understood that in the present invention, any of the technical features specifically described above and below (such as in the Examples) can be combined with each other, thereby constituting new or preferred technical solutions which will not redundantly be described one by one herein.

DESCRIPTION OF FIGURES

In FIG. 2, lanes 1 and 2 are replicates, Ladder is a molecular weight standard, the concentration of the test compounds is 10 μM, and the structures of compounds 115, 48 and 49 are shown in Table 1. This experiment was verified on two genes in the human genome, thus proving the broad spectrum of the compound's inhibition of gene editing. This experiment showed the test result of the T7E1 (reference: Guschin, D. Y. et al. *Methods Mol. Biol.* 649, 247-256 (2010)).

DETAILED DESCRIPTION OF INVENTION

Figure 1:
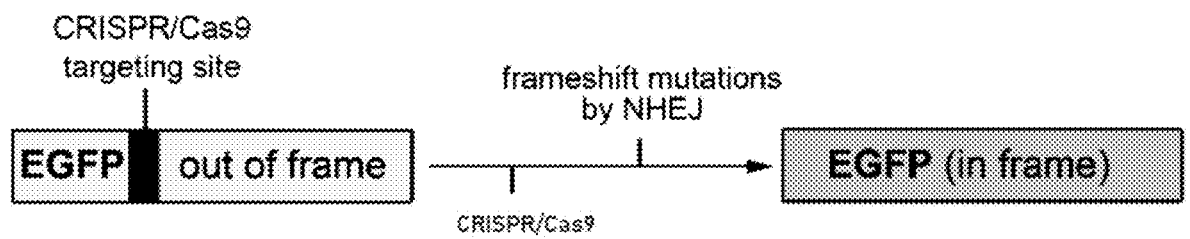
FIG. 1 shows a schematic diagram of reactivation of fluorescence by CRISPR/Cas9 gene editing in EGFP reporter cells, wherein NHEJ represents non-homologous end joining. After CRISPR/Cas9 editing, the DNA repair pathway of NHEJ was initiated by the cell. According to the principle of protein coding, there was a nearly ⅓ probability of repairing the reading frame of the fluorescent protein, thereby activating the fluorescent protein.

After extensive and in-depth research, the present inventors unexpectedly discovered for the first time that a compound with a structure as shown in Formula I can efficiently inhibit the function of Cas9 protein, thereby significantly improving the gene editing specificity of CRISPR/Cas9 protein. Experiments showed that the compound of Formula I (especially the compound of Formula A) can significantly inhibit CRISPR/Cas9-mediated gene editing, such as gene editing in HEK293 and K562 cells, thus improving the specificity of Cas9. On this basis, the inventor completed the present invention.

Terms

As used herein, the term "improving gene editing specificity" means reducing the off-target rate of gene editing, or increasing the N1/N0 ratio of gene editing, wherein N1 is the number of scheduled gene editing at specific sites (i.e. on); and N0 is the number of scheduled gene editing at non-specific sites (i.e. the number of off-target occurrences, off).

The term "C1-C3 alkylene" refers to a linear or branched alkylene group having 1 to 3 carbon atoms, such as methylene, ethylene, propylene, butylene, or the like.

The term "C3-C6 cycloalkylene" refers to a divalent cycloalkyl group having 3-6 carbon atoms, such as cyclopropylene, cyclobutylene, cyclopentylene, cyclohexylene.

The term "3-6 membered heterocyclylene" refers to a divalent ring group having 3-6 ring atoms and one or more ring atoms are heteroatoms (selected from the group consisting of N, O, S).

The term "C6-C10 arylene" refers to a divalent aryl group having 6-10 carbon atoms, such as a divalent phenyl or a divalent naphthyl.

The term "C3-C10 heteroarylene" refers to a divalent heteroaryl group having 3-10 ring atoms and one or more ring atoms are heteroatoms.

The term "C1-C10 alkyl" refers to a straight or branched chain alkyl group having 1-10 carbon atoms, such as methyl, ethyl, propyl, isopropyl, butyl, isobutyl, or the like.

The term "C2-C10 alkenyl" refers to a linear or branched alkenyl group having 2-10 carbon atoms, such as vinyl, propenyl, isopropenyl, butenyl, isobutenyl, or the like.

The term "C2-C10 alkenyloxy" refers to a straight or branched alkenyloxy group having 2-10 carbon atoms, such as ethyleneoxy, propyleneoxy, isopropenoxy, butenoxy, isobutenoxy, or the like.

The term "C2-C10 alkynyloxy" refers to a linear or branched alkynyloxy group having 2-10 carbon atoms, such as ethynyloxy, propynyloxy, isopropynyloxy, butynyloxy, isobutynyloxy, or the like.

The term "C2-C10 alkynyl" refers to a straight or branched chain alkynyl group having 2-10 carbon atoms, such as ethynyl, propynyl, isopropynyl, butynyl, isobutynyl, or the like.

The term "C1-C10 alkoxy" refers to a straight or branched chain alkyloxy group having 1-10 carbon atoms, such as methoxy, ethoxy, propoxy, isopropoxy, butoxy, isobutoxy, or the like.

The term "C3-C10 cycloalkyl" refers to a cycloalkyl group having 3-10 carbon atoms, such as cyclopropyl, cyclobutyl, cyclopentyl, or the like.

The term "5-10 membered heterocyclic ring" refers to a divalent ring group having 5-10 ring atoms and one or more ring atoms are heteroatoms.

The term "3-10 membered carbocyclic ring (containing 1-3 unsaturated bonds)" refers to a divalent cycloalkane group having 3-10 carbon atoms and 1-3 unsaturated bonds (such as alkenyl bonds or alkynyl bonds).

The term "5-8 membered ring" refers to a ring having 5-8 ring atoms, such as

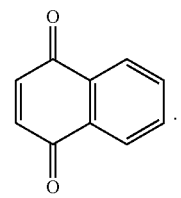 [SMILES: O=C1C=CC(=O)c2ccccc21]

The term "halogen" refers to F, Cl, Br and I. "Halo (or halogenated)" refers to fluoro, chloro, bromo, and iodo.

In the compound of Formula I, the various groups can be the specific groups at the corresponding positions in the table compound.

Gene Editing Inhibitor

As used herein, "compounds of the present invention", "compounds of Formula A", and "gene editing inhibitors of the present invention" are used interchangeably and refer to compound of the structure shown in Formula A, or pharmaceutically acceptable salt thereof, or optical isomer or racemates or solvates thereof. It should be understood that the term also includes mixtures of the aforementioned components.

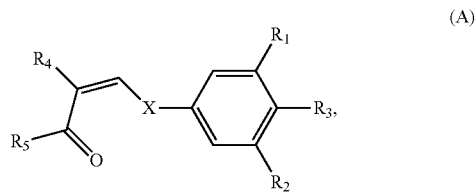

(A)

In the formula, the definition of each group is described as above.

In another preferred embodiment, preferred compound comprises the compound shown in Table 1, or pharmaceutically acceptable salt thereof, or optical isomer or racemate thereof, or solvate thereof.

In another preferred embodiment, the compound of Formula I is the compound shown in Table 1.

In the present invention, a pharmaceutically acceptable salt of the compound of Formula A is also included. The term "pharmaceutically acceptable salt" refers to a salt formed by a compound of the present invention and an acid or a base suitable for use as a medicine. Pharmaceutically acceptable salt comprises inorganic salt and organic salt. A preferred type of salt is a salt formed by a compound of the present invention with an acid.

Acid suitable for salt formation including but is not limited to: inorganic acids such as hydrochloric acid, hydrobromic acid, hydrofluoric acid, sulfuric acid, nitric acid, phosphoric acid, or organic acid such as formic acid, acetic acid, propionic acid, oxalic acid, malonic acid, succinic acid, fumaric acid, maleic acid, lactic acid, malic acid, tartaric acid, citric acid, picric acid, mesylate, benzenesulfonic acid, benzene sulfonic acid; and acidic amino acid such as aspartic acid and glutamic acid.

The compound of Formula A of the present invention can be prepared by methods well known to those skilled in the art in the prior art, and the reaction parameters of each step are not particularly limited.

As used herein, in the compound of Formula A, if there are chiral carbons, then the chiral carbons can be R, or S, or some mixture of the two.

Gene Editing

The compound of the present invention can significantly improve the specificity of gene editing.

In the present invention, representative gene editing comprises (but not limited to): CRISPR-based gene editing. Typically, CRISPR-based gene editing comprises CRISPR-Cas-based gene editing. Wherein, the Cas comprises Cas9 and the like.

Base Editing

Base editing (BEs) is a fourth-generation gene editing technology developed on the basis of CRISPR-Cas9, which can realize base replacement without cleaving DNA to form double-stranded breaks (DSBs), so it may have higher security.

At present, the main limitations of BE system are as follows: 1) It cannot realize instantaneous regulation in vivo (intracellular); 2) Outside the expected "in-window" (which may BE 4-8 bases depending on the different BE systems) cleavage, it may causes "out-of-window" cleavage. The enzyme used for base editing comprises APOBEC1, APOBEC3A and hAPOBEC3A.

Use

The combination of the compound of Formula A of the present invention and gene editing reagents can significantly improve the specificity of gene editing, and thus has revolutionary potential in different fields such as therapeutic applications.

The compound of Formula A of the present invention can be used to improve the specificity of CRISPR-mediated gene editing, and thus can be used to prevent or treat diseases associated with pathogenic genes.

In one embodiment, the present invention provides a non-therapeutic in vitro small molecule screening method for inhibiting CRISPR-mediated gene editing, comprising CRISPR-mediated gene knock-in and drug screening system.

The present invention also provides a method of using small molecules to inhibit CRISPR-mediated gene editing, which can be therapeutic or non-therapeutic. Generally, the method includes the step of administering the compound of Formula A of the present invention to a subject in need.

Preferably, the subject comprises human and non-human mammal (rodent, rabbit, monkey, livestock, dog, cat, etc.).

Composition and Method of Administration

The present invention provides a composition for promoting the specificity of CRISPR-mediated gene editing. The composition comprises (but not limited to): pharmaceutical composition, reagent composition for scientific research and the like.

In the present invention, the composition can be directly used to inhibit gene editing and/or improve gene editing specificity, such as single gene knock-in, double gene knock-in, point mutation, etc.

The present invention also provides a pharmaceutical composition, which contains a safe and effective amount of the compound of the present invention and a pharmaceutically acceptable carrier or excipient. Such carriers comprise (but not limited to): saline, buffer, dextrose, water, glycerol, ethanol, powder, and combinations thereof. The pharmaceutical preparation should matched with the method of administration.

Taking the pharmaceutical composition as an example, the composition of the present invention can be prepared in the form of an injection, for example, the composition can be prepared by conventional methods with normal saline or aqueous solutions containing glucose and other adjuvants. Pharmaceutical composition such as tablets and capsules can be prepared by conventional methods. Pharmaceutical composition such as injection, solution, tablet and capsule should be manufactured under sterile conditions. The drug combination of the present invention can also be made into powder for inhalation.

The pharmaceutical composition of the present invention can be administered to the subjects (such as human and non-human mammal) in need in a conventional manner. Representative administration methods comprise (but not limited to): oral administration, injection, topical administration, etc.

The main advantages of the present invention include:
(a) A small molecule compound that can significantly inhibit gene editing and/or improve gene editing specificity is provided for the first time. The compound is particularly effective for CRISPRCas9-mediated hPSC gene knock-in editing.
(b) The present invention provides a simple and efficient strategy for precise gene editing based on the combination of the compound of Formula A and CRISPR-Cas9.
(c) The compound of the present invention can enter the cell by directly incubating with the cell, thereby affecting the efficiency of gene editing.
(d) Some of the compounds disclosed in the present invention, such as compound 49, have been tested clinically and proved to be safe for humans.

The present invention will be further illustrated below with reference to the specific examples. It should be understood that these examples are only to illustrate the invention but not to limit the scope of the invention. The experimental methods without specific conditions in the following examples usually follow conventional conditions, such as Sambrook et al., Molecular Cloning: Laboratory Manual (New York: Cold Spring Harbor Laboratory Press, 1989), or according to the conditions recommended by the manufacturer. Unless indicated otherwise, parts and percentage are calculated by weight.

Example 1. Small Molecule Inhibitor Screening Based on EGFP Reporter

The EGFP reporter cell line was constructed as shown in FIG. 1. The CRISPR/Cas9 recognition site was inserted into the EGFP coding sequence so that the downstream sequence of the CRISPR/Cas9 recognition site was inside the box. The EGFP sequence was cleaved by Cas9 to produce double-strand breaks (DSBs), which would repair one of the two DNA repair mechanisms in the cell: non-homologous end joining (NHEJ) or homologous directed repair (HDR). The insertion or deletion introduced by NHEJ would restore the open reading frame of EGFP, thus activating EGFP fluorescence (FIG. 1).

Without inhibitors, treatment of the EGFP reporter with CRISPR/Cas9 from *Streptococcus pyogenes* (SpyCas9) usually results in 11% of fluorescent cells. With the presence of small molecule inhibitors, the percentage of fluorescent cells activated by SpyCas9 would decrease. The 50% inhibitory concentration of each compound ($IC_{50}$) can be determined by this assay.

The results are shown in Table 1.

TABLE 1

| No. | $IC_{50}(M)$ | CAS No. | Molecular formula & MW | Structural formula |
|---|---|---|---|---|
| 12 | ++ | 20426-12-4 | $C_{15}H_{12}O_2$ 224.26 | |
| 32 | ++ | 5535-48-8 | $C_8H_8O_2S$ 168.21 | |
| 48 | +++ | 481-42-5 | $C_{11}H_8O_3$ 188.18 | |
| 49 | ++++ | 1393477-72-9 | C17H11F6N7O 443.31 | |
| 75 | ++ | 458-37-7 | $C_{21}H_{20}O_6$ 368.39 | |
| 101 | ++ | 1774-66-9 | $C_{15}H_{11}BrO$ 287.16 | |
| 102 | ++ | 22966-19-4 | $C_{16}H_{14}O_2$ 238.29 | |
| 104 | ++ | | $C_{15}H_{11}ClO$ 242.70 | |

TABLE 1-continued
| No. | IC$_{50}$(M) | CAS No. | Molecular formula & MW | Structural formula |
|---|---|---|---|---|
| 105 | ++ | | C$_{15}$H$_{11}$ClO 242.70 | 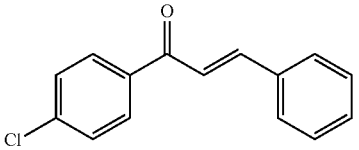 [SMILES: O=C(/C=C/c1ccccc1)c1ccc(Cl)cc1] |
| 110 | ++ | | C$_{15}$H$_9$F$_3$O 262.23 | 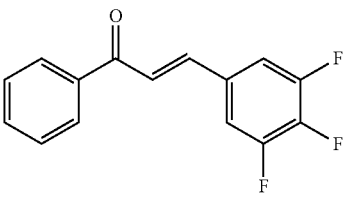 [SMILES: O=C(/C=C/c1cc(F)c(F)c(F)c1)c1ccccc1] |
| 111 | ++ | | C$_{16}$H$_{14}$O$_2$ 238.29 | 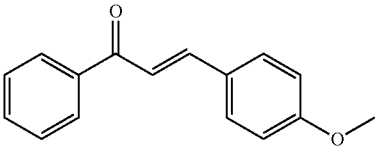 [SMILES: COc1ccc(/C=C/C(=O)c2ccccc2)cc1] |
| 119 | +++ | | C$_{12}$H$_{11}$FO$_3$S 254.28 | 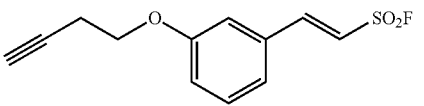 [SMILES: C#CCCOc1cccc(/C=C/S(=O)(=O)F)c1] |
| 120 | +++ | | C$_{14}$H$_{11}$BrO$_3$S 339.20 | 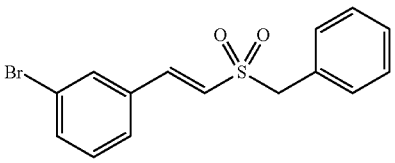 [SMILES: O=S(=O)(/C=C/c1cccc(Br)c1)Cc1ccccc1] |
| 127 | ++ | | C$_{15}$H$_{11}$BrO 287.16 | 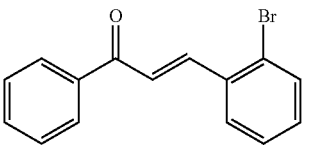 [SMILES: O=C(/C=C/c1ccccc1Br)c1ccccc1] |
| 801 | + | 14755-02-3 | C$_9$H$_8$O$_3$ 164.16 | 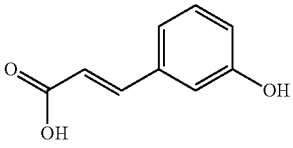 [SMILES: O=C(O)/C=C/c1cccc(O)c1] |
| 802 | + | 501-98-4 | C$_9$H$_8$O$_3$ 164.16 | 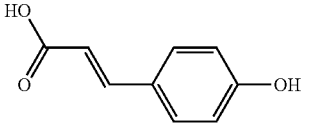 |
| 803 | + | 537-98-4 | C$_{10}$H$_{10}$O$_4$ 194.19 | 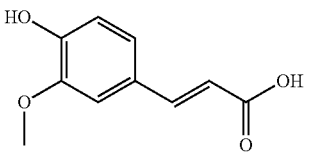 |

TABLE 1-continued

| No. | IC$_{50}$(M) | CAS No. | Molecular formula & MW | Structural formula |
|---|---|---|---|---|
| 804 | + | 19367-38-5 | C$_{10}$H$_{10}$O$_3$ 178.19 | |
| 811 | + | 537-42-8 | C$_{16}$H$_{16}$O$_3$ 256.30 | |
| 813 | + | 961-29-5 | C$_{15}$H$_{12}$O$_4$ 256.26 | |
| 814 | + | 154-23-4 | C$_{15}$H$_{14}$O$_6$·XH$_2$O 290.27(Anh.) | |
| 815 | + | 14919-49-4 | C$_{15}$H$_{10}$O$_4$ 254.24 | |
| 816 | + | 17348-76-4 | C$_{15}$H$_{12}$O$_3$ 240.26 | |
| 817 | + | 92496-65-6 | C$_{15}$H$_{12}$O$_3$ 240.26 | |

TABLE 1-continued

| No. | IC$_{50}$(M) | CAS No. | Molecular formula & MW | Structural formula |
|---|---|---|---|---|
| 825 | + | 79-39-0 | C$_4$H$_7$NO 85.10 | |
| 826 | + | 624-49-7 | C$_6$H$_8$O$_4$ 144.13 | |
| 827 | + | 101-39-3 | C$_{10}$H$_{10}$O 146.19 | |
| 828 | + | 96-33-3 | C$_4$H$_6$O$_2$ 86.09 | |
| 829 | + | 2680-03-7 | C$_5$H$_9$NO 99.13 | |
| 830 | + | 3680-02-2 | C$_3$H$_6$O$_2$S 106.14 | |
| 831 | + | 79-06-1 | C$_3$H$_5$NO 71.08 | |
| 833 | + | 439081-18-2 | C$_{24}$H$_{25}$ClFN$_5$O$_3$ 485.94 | |
| 834 | + | 319460-85-0 | C$_{22}$H$_{18}$N$_4$OS 386.47 | |

TABLE 1-continued
| No. | IC$_{50}$(M) | CAS No. | Molecular formula & MW | Structural formula |
|---|---|---|---|---|
| 835 | + | 187164-19-8 | C$_{14}$H$_9$C$_{12}$N$_3$S$_2$ 354.28 | 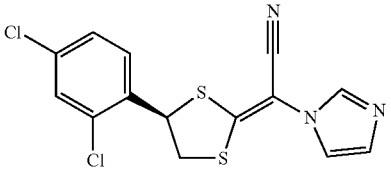 [SMILES: N#C/C(=C1/SC[C@@H](c2ccc(Cl)cc2Cl)S1)n1ccnc1] |
| 836 | + | 53179-13-8 | C$_{12}$H$_{11}$NO 185.22 | 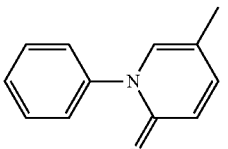 |
| 837 | + | 108605-62-5 | C$_{12}$H$_9$F$_3$N$_2$O$_2$ 270.21 | 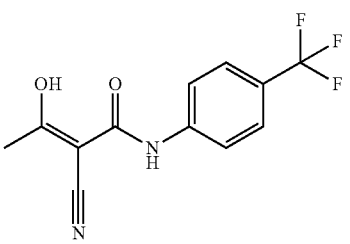 [SMILES: C/C(O)=C(\C#N)C(=O)Nc1ccc(C(F)(F)F)cc1] |
| 838 | + | 128-53-0 | C6H7NO2 125.13 | 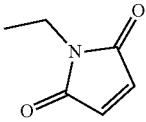 |
| 839 | + | 107-13-1 | C3H3N 53.06 | 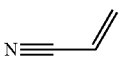 |
| 840 | + | | C14H17NO 215.13 | 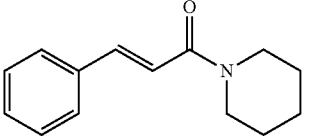 [SMILES: O=C(/C=C/c1ccccc1)N1CCCCC1] |
| 841 | + | | C13H15NO2 217.11 | 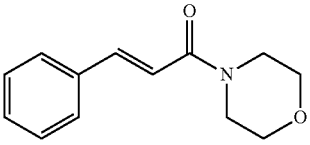 [SMILES: O=C(/C=C/c1ccccc1)N1CCOCC1] |
| 842 | + | | C13H17NO 203.13 | 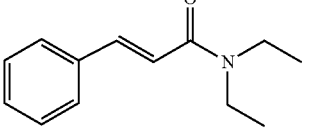 |
| 843 | + | | C11H13NO 175.10 | 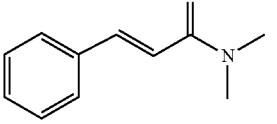 |

TABLE 1-continued

| No. | IC$_{50}$(M) | CAS No. | Molecular formula & MW | Structural formula |
|---|---|---|---|---|
| 844 | + | | C18H24N2O3 316.18 | cinnamoyl-piperazine-Boc |
| 845 | + | | C20H22N2O 306.17 | cinnamoyl-(4-benzyl)piperazine |
| 846 | + | | C17H17NO2 267.13 | cinnamoyl-NH-CH2-(4-methoxyphenyl) |
| 847 | + | | C9H10O2S 182.24 | styryl methyl sulfone |
| 850 | + | 117-39-5 | C15H10O7 302.24 | quercetin |
| 851 | + | | C9H9NO 147.17 | cinnamamide |
| 852 | + | | C16H15NO 237.30 | N-benzyl cinnamamide |
| 853 | + | | C13H17NO2 219.28 | N-(2-ethoxyethyl) cinnamamide |
| 854 | + | | C12H13NO 187.24 | N-cyclopropyl cinnamamide |

TABLE 1-continued
| No. | IC$_{50}$(M) | CAS No. | Molecular formula & MW | Structural formula |
|---|---|---|---|---|
| 855 | + | | C13H15NO 201.26 | 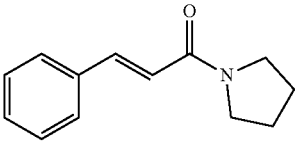 [SMILES: O=C(/C=C/c1ccccc1)N1CCCC1] |
| 856 | + | | C15H13NO 223.27 | 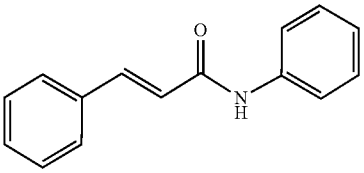 |
| 857 | + | | C16H15NO2 253.30 | 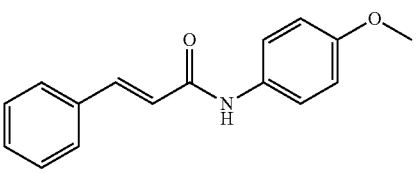 [SMILES: COc1ccc(NC(=O)/C=C/c2ccccc2)cc1] |
| 858 | + | | C16H15NO2 253.30 | 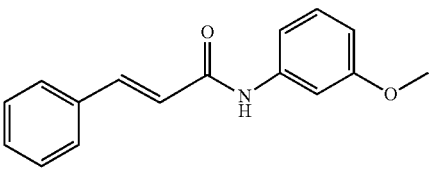 [SMILES: COc1cccc(NC(=O)C/C=C/c2ccccc2)c1] |
| 859 | + | | $C_{15}H_{11}F_2NO$ 259.25 | 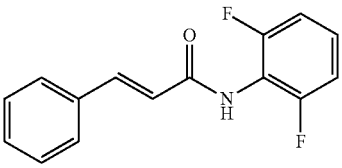 [SMILES: O=C(/C=C/c1ccccc1)Nc1c(F)cccc1F] |
| 860 | + | | C16H15NOS 269.36 | 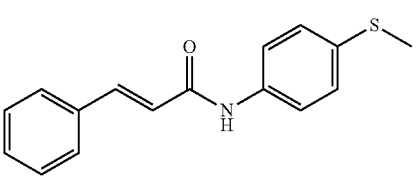 [SMILES: CSc1ccc(NC(=O)/C=C/c2ccccc2)cc1] |
| 861 | + | | $C_{15}H_{12}N_2O_3$ 268.27 | 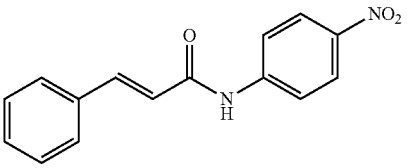 [SMILES: O=C(/C=C/c1ccccc1)Nc1ccc([N+](=O)[O-])cc1] |
| 862 | + | | C14H12N2O 224.26 | 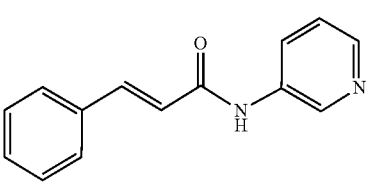 [SMILES: O=C(Nc1cccnc1)C1=C(c2ccccc2)C1] |

TABLE 1-continued

| No. | IC$_{50}$(M) | CAS No. | Molecular formula & MW | Structural formula |
|---|---|---|---|---|
| 863 | + | | C16H15NO 237.30 | |
| 864 | + | | C$_{12}$H$_{15}$NO$_3$S 253.32 | |
| 865 | + | | C$_8$H$_9$NO$_3$S 183.23 | |
| 866 | + | | C$_{17}$H$_{24}$N$_2$O$_4$S 352.45 | |
| 867 | + | | C$_{12}$H$_{17}$NO$_3$S 255.33 | |
| 868 | + | | C$_{12}$H$_{17}$NO$_2$S 239.33 | |
| 869 | + | | C$_{19}$H$_{22}$N$_2$O$_2$S 342.46 | |
| 870 | + | | C$_{15}$H$_{21}$NO$_2$S 279.40 | |

TABLE 1-continued

| No. | IC$_{50}$(M) | CAS No. | Molecular formula & MW | Structural formula |
|---|---|---|---|---|
| 871 | + | | C$_{14}$H$_{21}$NO$_2$S<br>267.39 | |
| 872 | + | | C$_{13}$H$_{17}$NO$_2$S<br>251.34 | |
| 873 | + | | C$_{17}$H$_{19}$NO$_2$S<br>301.40 | |
| 874 | + | 3/4/7689 | C$_{20}$H$_{16}$N$_2$O$_4$<br>348.36 | |
| 876 | + | 848133-35-7 | C$_6$H$_{12}$ClNO$_2$<br>165.62 | |
| 877 | + | | C$_{14}$H$_{11}$IO$_3$S<br>386.20 | |
| 878 | + | | C$_{17}$H$_{18}$O$_3$S<br>302.39 | |
| 879 | + | | C$_{14}$H$_{11}$FO$_3$S<br>278.30 | |
| 880 | + | | C$_{14}$H$_{11}$BrO$_3$S<br>339.20 | |

TABLE 1-continued

| No. | IC$_{50}$(M) | CAS No. | Molecular formula & MW | Structural formula |
|---|---|---|---|---|
| 881 | + | | C$_{12}$H$_8$Br$_2$FNO$_2$S 409.07 | |
| 882 | + | | C$_{18}$H$_2$OBrFN$_2$OS 411.33 | |
| 883 | + | | C7H8FNO2S 189.20 | |
| 884 | + | | C$_{11}$H$_{14}$FNO$_2$S 243.30 | |
| 885 | + | 930-68-7 | C$_6$H$_8$O 96.13 | |
| 886 | + | | C$_{16}$H$_{12}$O$_2$ 252.27 | |
| 887 | + | | C$_{17}$H$_{17}$NO 251.33 | |
| 888 | + | | C$_5$H$_6$O 82.10 | |
| 889 | + | | C$_{11}$H$_9$BrO$_3$ 269.09 | |
| 890 | + | | C$_{10}$H$_{10}$O 146.19 | |

TABLE 1-continued

| No. | IC$_{50}$(M) | CAS No. | Molecular formula & MW | Structural formula |
|---|---|---|---|---|
| 892 | + | | C$_{15}$H$_{13}$ClO$_3$S 308.78 | |
| 893 | + | | C$_{14}$H$_{11}$ClO$_2$S 278.75 | |
| 894 | + | | C8H15NO 141.21 | |
| 895 | + | | C$_{15}$H$_{10}$Cl$_2$O 277 | |
| 896 | + | | C15H10Br2O 366.05 | |
| 897 | + | | C22H30O3 342.48 | |
| 898 | + | 437611-94-4 | C16H10O3 250.25 | |

TABLE 1-continued

| No. | IC$_{50}$(M) | CAS No. | Molecular formula & MW | Structural formula |
|---|---|---|---|---|
| 899 | + | | C11H9BrO3 269.09 | |
| 900 | + | 2403-27-2 | C15H11BrO 287.16 | |
| 901 | +++ | KPT335 | C$_{18}$H$_{12}$F$_6$N$_6$O 442.33 | |
| 902 | +++ | KPT185 | C$_{16}$H$_{16}$F$_3$N$_3$O$_3$ 355.32 | |
| 903 | +++ | KPT276 | C$_{16}$H$_{10}$F$_8$N$_4$O 426.27 | |
| 904 | +++ | KPT8602 | C$_{17}$H$_{10}$F$_6$N$_6$O 428.30 | |

TABLE 1-continued

| No. | IC$_{50}$(M) | CAS No. | Molecular formula & MW | Structural formula |
|---|---|---|---|---|
| 905 | +++ | Piperlongumine | C17H19NO5 317.34 | 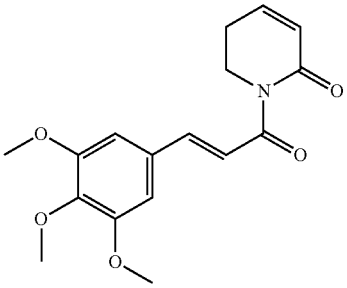 [SMILES: COc1cc(/C=C/C(=O)N2CCC=CC2=O)cc(OC)c1OC] |

Note: + means the IC$_{50}$ of compound was >100, ++ means the IC$_{50}$ of compound was 10 < IC$_{50}$ < 100, +++ means the IC$_{50}$ of compound was 1 < IC$_{50}$ < 10, and of compound was <1.

Example 2. The Activity of Compounds in Inhibiting the Cas9 on Endogenous Genes

2.1 Method

HEK293 cells ($10^5$ cells/well) were seeded on a 24-well plate. 24 hours after inoculation, cells were transfected with 200 ng AAVS1-AS2 and 200 ng pST-Cas9 plasmid or 200 ng EMX1 and 200 ng pST-Cas9 plasmid in Opti-MEM medium. 6 hours after transfection, DMEM supplemented with 10% FBS and 10 μM drug (Compound 49) was used to replace Opti-MEM. The positive control for Cas9 activity was 200 ng AAVS1-AS2 and 200 ng pST-Cas9 plasmid or 200 ng EMX1 and 200 ng pST-Cas9 plasmid without drug. After the gene editing was completed, the cell genomic DNA was extracted, and the gene editing efficiency was tested by the T7E1 method (see Guschin, D. Y. et al. *Methods Mol. Biol.* 649, 247-256 (2010))).

2.2 Result

Figure 2:
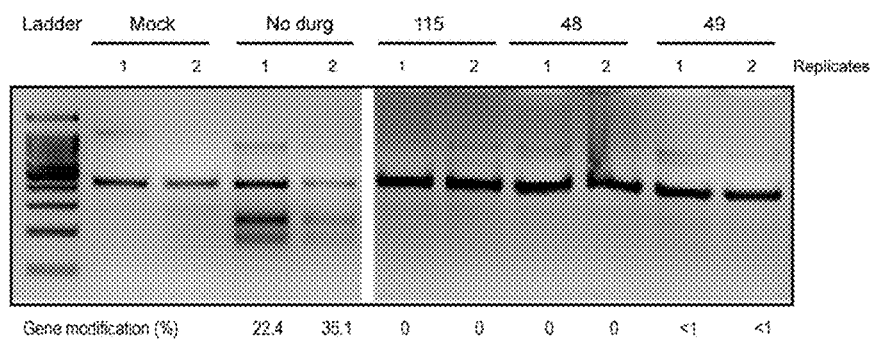
FIG. 2 shows that in an example of the present invention, some compounds have inhibitory activity on gene editing of SpyCas9 expressed by plasmids.
Figure 2:
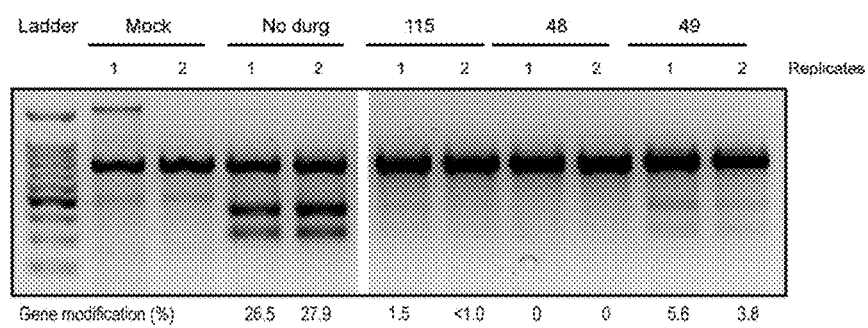

The result is shown in FIG. 2. In the experiment of transfecting cells with AAVS1-AS2 and pST-Cas9 plasmids, compared with the mock (blank control) group, the gene modification rate of the no-drug group was 22.4% and 35.1%, while the gene modification rate of the group with Compounds 115 and 48 was 0%, and the gene modification rate of the group with Compound 49 was <1%.

In the experiment of transfecting cells with EMX1 and pST-Cas9 plasmids, compared with the mock group, the gene modification rate of the no-drug group was 26.5% and 27.9%, while the gene modification rate of the group with Compound 48 was 0%, the gene modification rate of the group with Compound 115 was ≤1.5%, and the gene modification rate of the group with Compound 49 was 5.6% and 3.8%.

Therefore, Compounds 49, 115 and 48 can inhibit the gene editing activity of SpyCas9 expressed by the plasmid on multiple genes.

Example 3. Compound 49 Enhances the Specificity of SpyCas9-Based Gene Editing

3.1 Method

SpyCas9 was lipid transfected into HEK293 cells or nuclear transfected into K562 cells to determine the effect of compound 49 on the specificity of SpyCas9 in multiple cell lines on different genes. The inhibitor was added to the culture 6 hours after transfection. The detection method is the same as in Example 2.

3.2 Result

Figure 3:
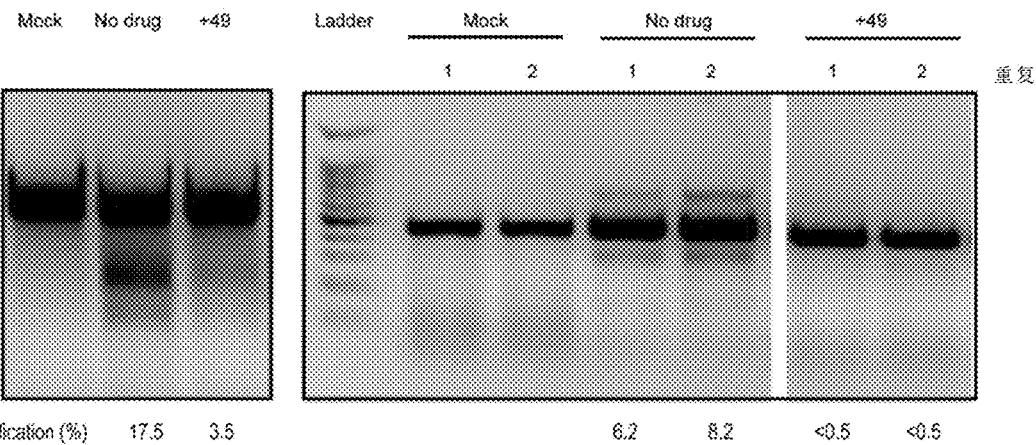
FIG. 3 is the test result of the T7E1, which shows that Compound 49 can enhance the specificity of SpyCas9-based gene editing. By comparing the ratio of targeted editing and off-target editing, it is found that targeted editing/off-target editing (i.e. gene editing specificity) has been improved with the addition of inhibitors. The experiment showed the results of two genes (EMX1 and AAVS1) and related off-target sites in two cell lines (HEK293 and K562), which proved the broad spectrum of the conclusion.
Figure 3:
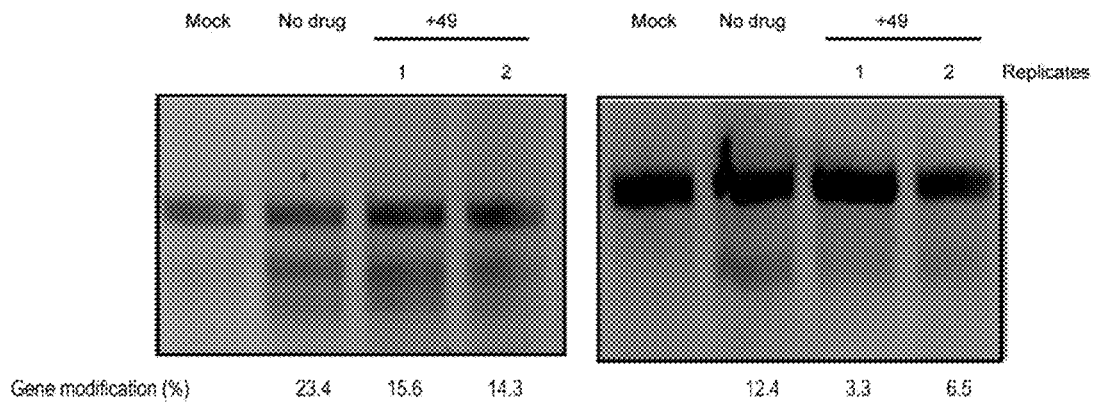

As shown in FIG. 3, in HEK293 cells, when no compound was added, the ratio of the number of scheduled gene editing at specific sites to the number of scheduled gene editing at non-specific sites was 2.4, while after Compound 49 was added, the ratio of the number of scheduled gene editing at specific sites to the number of scheduled gene editing at non-specific sites was 7, which was raised by 2.9-fold, which shows that Compound 49 improved the specificity of SpyCas9.

Example 4. Inhibitory Activity of Compound 49 to *Staphylococcus aureus* Cas9 (SaCas9)

4.1 Method

The method of this example was similar to 2.1, except that pST-Cas9 was replaced with a plasmid containing SaCas9. The detection method was the same as in Example 2.

4.2 Result

Figure 4:
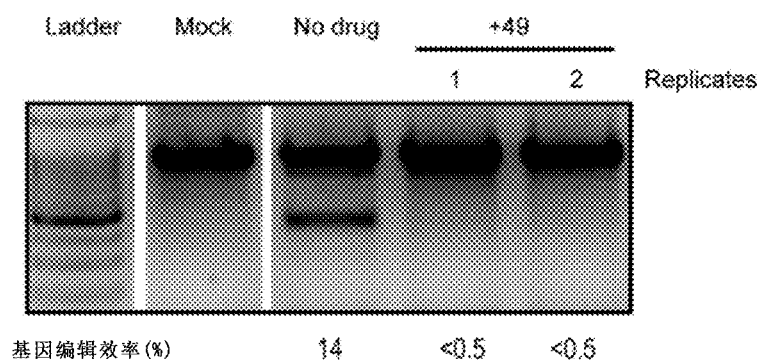
FIG. 4 is the test result of the T7E1, which shows that Compound 49 has inhibitory activity on SaCas9 gene editing. This experiment proves the compounds which the present application relate to has broad spectrum of inhibitory activity on the CRISPR system.

As shown in FIG. 4, when compared with the mock group, the gene modification rate of the group without drug was 14%, while the gene modification rate of the group added with Compound 49 was <0.5%, which indicates that Compound 49 can also inhibit the activity of SaCas9 expressed by plasmids in cell culture experiment.

Example 5. The Inhibitory Activity of Compounds Modified on the Basis of Compound 49 on Gene Editing

5.1 Method

In order to further prove the malleability of the compound, the inventors tested the analogs of Compound 49 (901-905) to determine their effects on gene editing. The method of this example was the same as in Example 2.

5.2 Result

Figure 5:
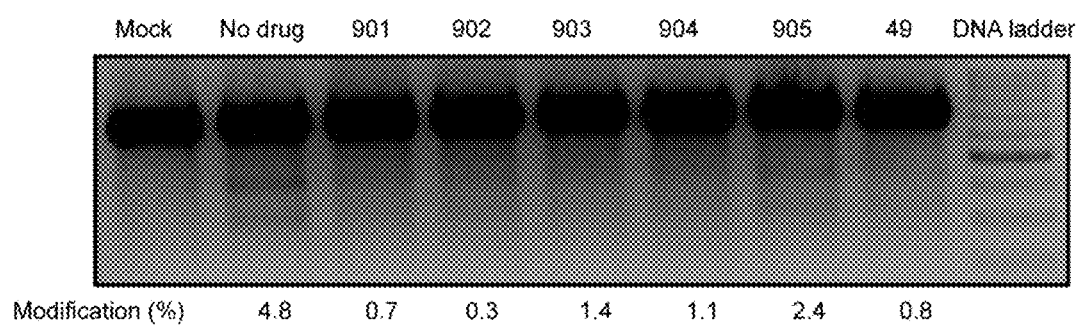
FIG. 5 is the test result of the T7E1, which shows that a series of compounds modified from Compound 49 have inhibitory activity on gene editing, thus proving the derivable of the compounds.

The result was shown in FIG. 5. Compared with the no-drug group (editing efficiency was 4.8%), Compounds 901-905 and Compound 49 can significantly reduce gene editing efficiency. This indicates that these test compounds would inhibit the gene editing activity of SpyCas9.

Example 6. Compound 49 Regulates the Base Editing System

6.1 Method

HEK293T cells ($10^5$ cells/well) were seeded on a 24-well plate. 24 hours after inoculation, cells were transfected with 250 ng sgRNA expression plasmid and 500 ng dCas9-DNMT3a-DNMT31 plasmid system in Opti-MEM medium. 6 hours after transfection, DMEM supplemented with 10% FBS and 500 nM drug (Compound 49) was used to replace Opti-MEM. The positive control was DMEM containing 10% FBS with an equal volume of DMSO solvent control instead of Opti-MEM. 48 h after transfection, cell genomic DNA was extracted, and deep sequencing was performed after PCR amplification of the sgRNA targeting sequence.

6.2 Result

Figure 6:
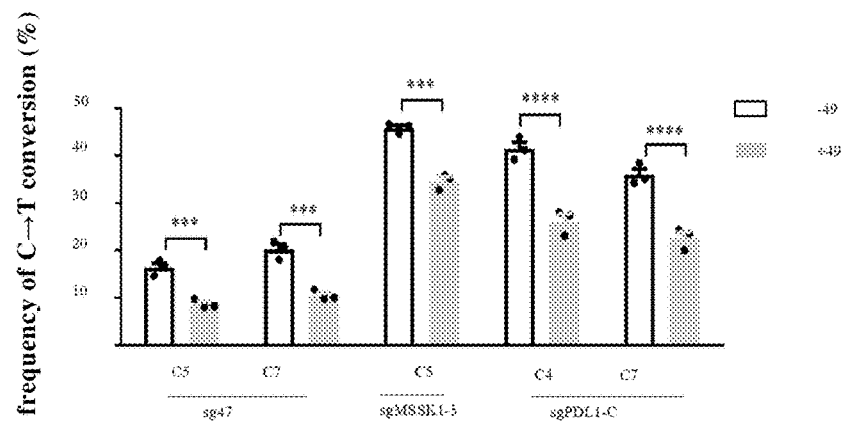
FIG. 6 shows that Compound 49 can effectively reduce the on-target cleavage of different sgRNAs, and can be used as an "off-switch" to regulate the base editing system.

The result was shown in FIG. 6. Through deep sequencing results, it was found that KPT drug (Compound 49) can effectively reduce the on-target cleavage of different sgRNAs, and can be used as an "off-switch" to regulate the base editing system.

Specifically, for the C on $5^{th}$ site, when sg47 was used, the C→T conversion frequency was reduced from 18% to 9%, of which the decrease rate was 50%.

Example 7. Improvement of Base Editing Specificity by Compound 49

7.1 Method

The method of this example was the same as in Example 6.1.

7.2 Result

Figure 7:
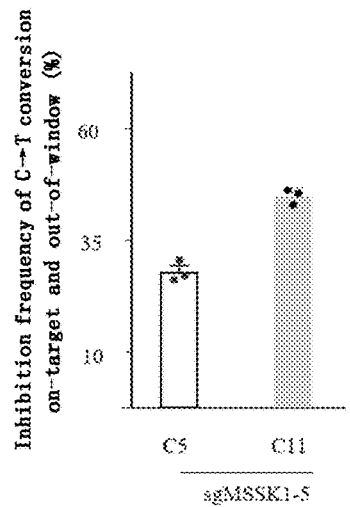
FIG. 7 shows that Compound 49 has a higher inhibition of out-of-window activity, i.e., improves the specificity of base editing.

The result was shown in FIG. 7. Through the deep sequencing results, it was found that the KPT drug (Compound 49) has a higher inhibition ability to out-of-window activity, thus improving the specificity of base editing.

Specifically, when sgMSSK1-5 was used, the C→T conversion inhibition efficiency was 30% for the C on $5^{th}$ site in the window; for the C on $11^{th}$ site out-of-window, the C→T conversion inhibition efficiency was 50%. The inhibition rate on $11^{th}$ site was greater than on $5^{th}$ site.

Example 8. Base Indel Editing of Compound 49

8.1 Method

The method of this example was the same as in Example 6.1.

8.2 Result

Figure 8:
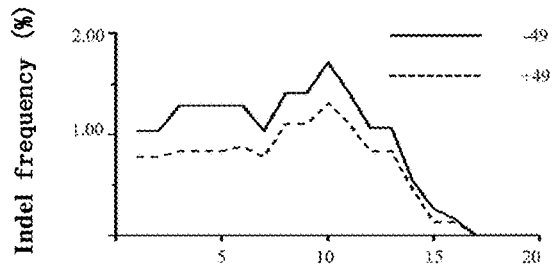
FIG. 8 shows that Compound 49 inhibits indel of base editing, that is, it increases the specificity of base editing.

The result was shown in FIG. 8. Through the results of deep sequencing, it was found that the KPT drug (Compound 49) inhibited the indel of base editing, i.e. improving the specificity of base editing.

Specifically, when sg48 was used, the indel frequency was reduced overall without changing the sg48 targeted 20 bp mutation pattern.

All literatures mentioned in the present application are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A method for improving the specificity of gene editing, the method comprises a step of:
   in the presence of a gene editing inhibitor, performing gene editing on cell so as to improve the specificity of gene editing in the cell,
   wherein the gene editing inhibitor is a compound represented by Formula A, or a pharmaceutically acceptable salt thereof;

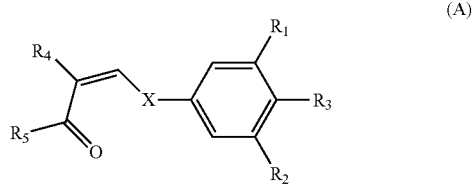

(A)

wherein,
X is

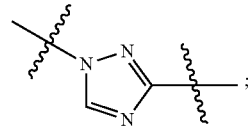 [SMILES: *c1ncn(*)n1]

;

R1, R2 and R3 are each independently selected from the group consisting of H, halogen, C1-C6 alkyl, halogenated C1-C6 alkyl, C1-C6 alkoxy, halogenated C1-C6 alkoxy;

R4 is selected from the group consisting of H, 6-membered aromatic heterocyclic ring containing 1-2 nitrogen atoms;

R5 is selected from the group consisting of amino, substituted or unsubstituted C1-C6 alkoxy, substituted or unsubstituted 6-membered aromatic heterocyclic ring containing 1-2 nitrogen atoms —NH—NH—, substituted or unsubstituted 4-6-membered unsaturated heterocyclic ring containing 1-2 nitrogen atoms; the substituted means substituted by group selected from the group consisting of halogen and oxo;

wherein the gene editing is CRISPR-Cas9-based gene editing.

2. The method of claim 1, wherein the "improving gene editing specificity" comprises reducing the off-target ratio of gene editing, increasing the ratio of targeted/off-target ratio in gene editing.

3. The method of claim 1, wherein the "improving gene editing specificity" is A2/A1≥1.5, wherein A1 represents the ratio between the number of scheduled gene editing at specific sites to the number of scheduled gene editing at non-specific sites when no compound is added during gene editing, A2 represents the ratio between the number of scheduled gene editing at specific sites and the number of scheduled gene editing at non-specific sites when the compound is added.

4. The method of claim 1, wherein the method is in vitro or in vivo.

5. The method of claim 1, wherein the 6-membered aromatic heterocyclic ring containing 1-2 nitrogen atoms is

or

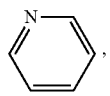, and the substituted or unsubstituted 4-6-membered unsaturated heterocyclic ring containing 1-2 nitrogen atoms is

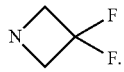

6. The method of claim 1, wherein the compound is

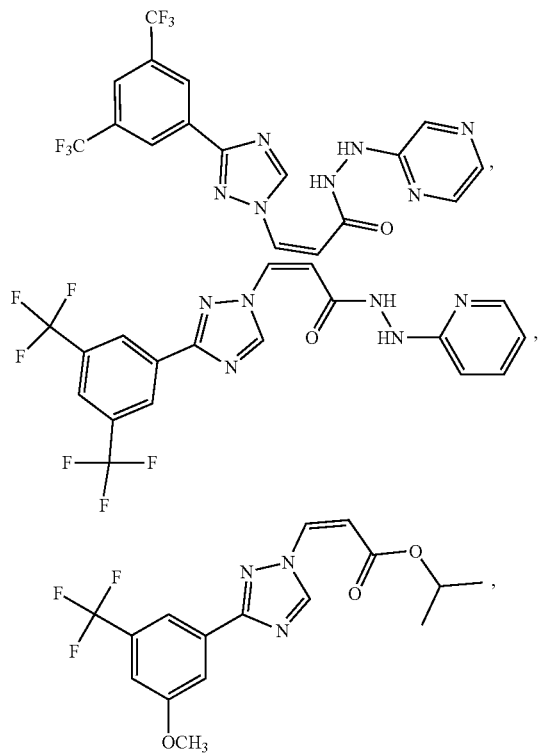

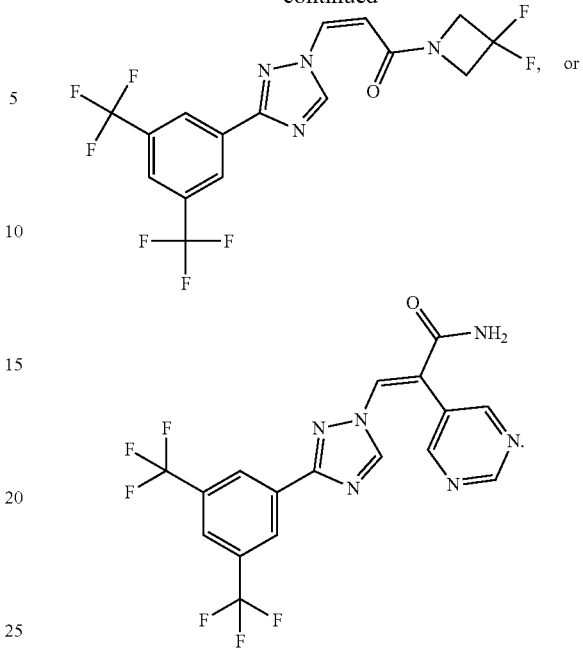

7. The method of claim 3, wherein the "improving gene editing specificity" is A2/A1≥2.

8. The method of claim 3, wherein the "improving gene editing specificity" is A2/A1≥3.

9. The method of claim 1, wherein the Cas9 comprises wild-type or mutant-type Cas9 proteins.

10. The method of claim 1, wherein the Cas9 is selected from the group consisting of *Streptococcus pyogenes* Cas9 (SpyCas9), and *Staphylococcus aureus* Cas9 (SaCas9).

11. The method of claim 1, wherein the gene editing is for samples selected from the group consisting of cells, tissues, organs, or combinations thereof, and the sample is from animals excluding human, plants, or microorganisms.

12. The method of claim 11, wherein the cells include primary cells or passaged cells.

13. The method of claim 11, wherein that the cells comprise somatic cells, germ cells, or stem cells.

14. The method of claim 13, wherein the stem cells comprises totipotent stem cells, pluripotent stem cells, or monopotent stem cells.

15. The method of claim 13, wherein the stem cells comprises the cells comprise embryonic stem cells, adipose stem cells, hematopoietic stem cells, or immune cells.

16. The method of claim 1, wherein before, during, and/or after the administration of the gene editing inhibitor, a subject is administered a gene editing agent for gene editing to perform the gene editing in the presence of the gene editing inhibitor and the gene editing agent.

* * * * *